Patented Mar. 20, 1923.

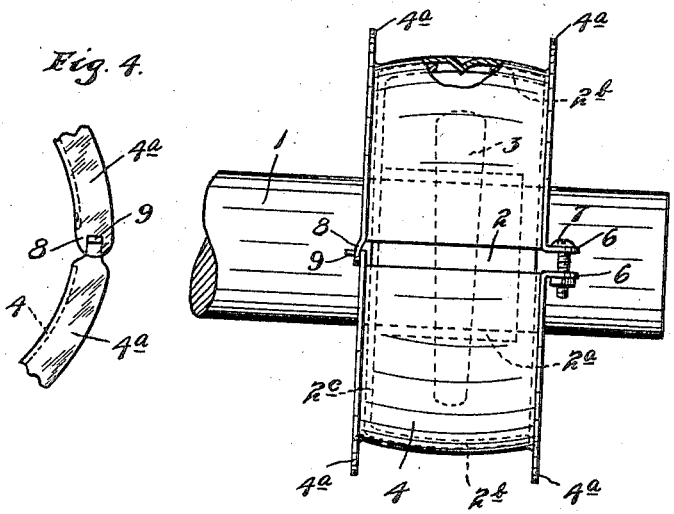
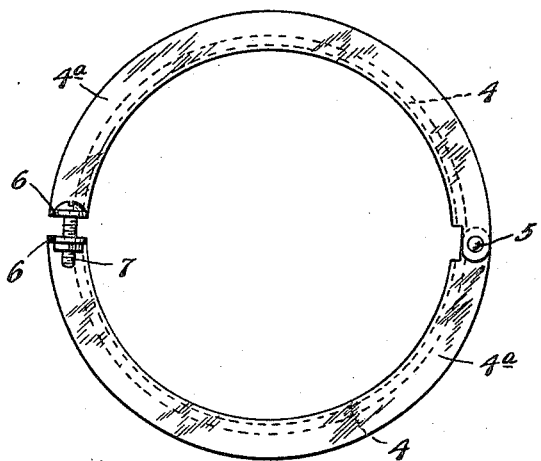
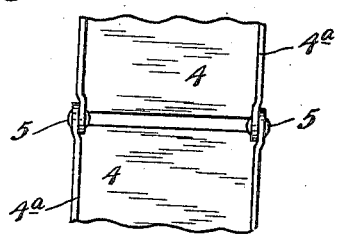

1,448,963

UNITED STATES PATENT OFFICE.

MARTIN A. JOBE, OF MINNEAPOLIS, MINNESOTA, ASSIGNOR OF ONE-HALF TO FRANK P. MARLING, OF MINNEAPOLIS, MINNESOTA.

PULLEY ATTACHMENT.

Application filed February 12, 1921. Serial No. 444,412.

*To all whom it may concern:*

Be it known that I, MARTIN A. JOBE, a citizen of the United States, residing at Minneapolis, in the county of Hennepin and State of Minnesota, have invented certain new and useful Improvements in Pulley Attachments; and I do hereby declare the following to be a full, clear, and exact description of the invention, such as will enable others skilled in the art to which it appertains to make and use the same.

This invention relates to a belt pulley, and particularly, to an attachment for a plain pulley, which attachment is arranged to be attached to the pulley and provide a belt surface with side flanges thereon to retain the belt in operative relation to the pulley. In the well known Ford automobile and other automobiles, a small pulley is used on the front of the engine shaft to drive a radiator fan. It has become quite common practice to attach a pump to this type of automobile and to also drive the pump from the same pulley that drives the fan. The pulley commonly used has just a plain face and the extra load placed upon this small pulley has very frequently caused the belt to run off of the same. This, of course, requires that the belt be replaced and such replacement takes time and is troublesome and inconvenient.

It is an object of this invention, therefore, to provide an attachment for such pulleys which can be easily and readily attached to the pulley whereby a belt surface is provided having a guide flange at each side thereof, which flange will positively act to retain the belt on the pulley.

This and other objects and advantages of the invention will be apparent from the following description made in connection with the accompanying drawings in which like reference characters refer to the same parts throughout the different views, and in which Fig. 1 is a view in front elevation of the pulley with the attachment applied thereto, together with the pulley carrying shaft;

Fig. 2 is a view in side elevation of the attachment as seen from the right of Fig. 1; and Fig. 3 is a partial front view of the attachment as seen from the right of Fig. 2; and Fig. 4 is a partial side view of the attachment showing the engagement of the flange ends.

Referring to the drawings, the front end of the engaging shaft 1 is shown having the usual pulley 2 secured thereon by a pin 3. This pulley, as illustrated, is made of thin metal and comprises the hub portion $2^a$ and the flange portion $2^b$, these being connected at one side only by a flange $2^c$.

In accordance with this invention, an attachment is provided which, as shown, comprises two substantially semi-circular channel members 4, having flanges $4^a$ at each side thereof, adapted to be connected at one of their ends by rivets or other suitable pivot members 5. As shown in Fig. 3, the ends of the flanges of one member are bent slightly together and the ends of the flanges on the other member are bent slightly outward, the first mentioned ends being disposed within the second mentioned ends, and the rivets 5 passed through these adjacent ends. The members 4 have lateral flanges bent outwardly on one side of the other ends thereof to form outstanding lugs 6 which are apertured to receive a small nutted bolt 7. The flange on the other side on one of the members 4 is turned slightly outwardly and apertured to form in effect an ear 8 and the end of the similar flange on the other member 4 is formed with an extending and outwardly bent tongue 9 adapted to pass through the aperture in the ear 8.

With the construction described, it is seen that the members 4 form a substantially continuous circumferential surface for the pulley belt, and the flanges $4^a$, likewise, form substantially continuous and smooth guiding means to hold the belt on the pulley surface.

As shown in Fig. 1, the device is designed to be placed over the usual pulley 2, the sections 4 being loosened or expanded by loosening of the bolt 7. When the device has been properly placed upon the pulley, members 8 and 9, are in engagement and the bolt 7 tightened to firmly clamp the members 4 thereon.

The attachment being on the pulley there will be no possibility of the belt slipping off the sides thereof and the trouble and inconvenience of replacing the belt will be avoided. The attachment is capable of application to any ordinary cylindrical pulley and will form a very efficient means for the purpose intended. The device will also be found useful where it is desired to slightly increase the diameter of a pulley. An automobile or other pulley equipped with the device of this invention will be capable of withstanding considerable extra load without the danger of the belt slipping off.

A pulley such as described is often provided with a hole in the rim thereof through which the pin 3 is inserted to be driven into place. If desired, a portion of one of the members 4 may be pressed or dented into this hole as shown in Fig. 1, to furnish additional means to hold the members 4 in fixed relation to the pulley and to prevent said members from revolving relative thereto.

It will, of course, be understood that various changes in the form, details and proportions of the device may be made without departing from the scope of applicant's invention, which, generally stated, consists in the matter shown and described and set forth in the appended claims.

What is claimed is:

1. An attachment for a belt pulley comprising two semicircular channel members with their flanges projecting outwardly at each side thereof, the flanges of the members at one end being arranged in overlapping relation and hinged together and the ends of the flanges at one side at the other end being arranged in interlocking engagement and at the other side being out-turned to form projecting lugs, and a clamping means for drawing said lugs together whereby the channel members will be firmly clamped upon the pulley.

2. An attachment for a pulley comprising a pair of semi-cylindrical members, said members having outwardly extending flanges at each side edge thereof disposed in planes normal to the axis of the cylinder, said flanges being hinged together at one end and adjustably connected at their other ends whereby they may be clamped on a pulley to form a flanged pulley.

In testimony whereof I affix my signature.

MARTIN A. JOBE.